UNITED STATES PATENT OFFICE.

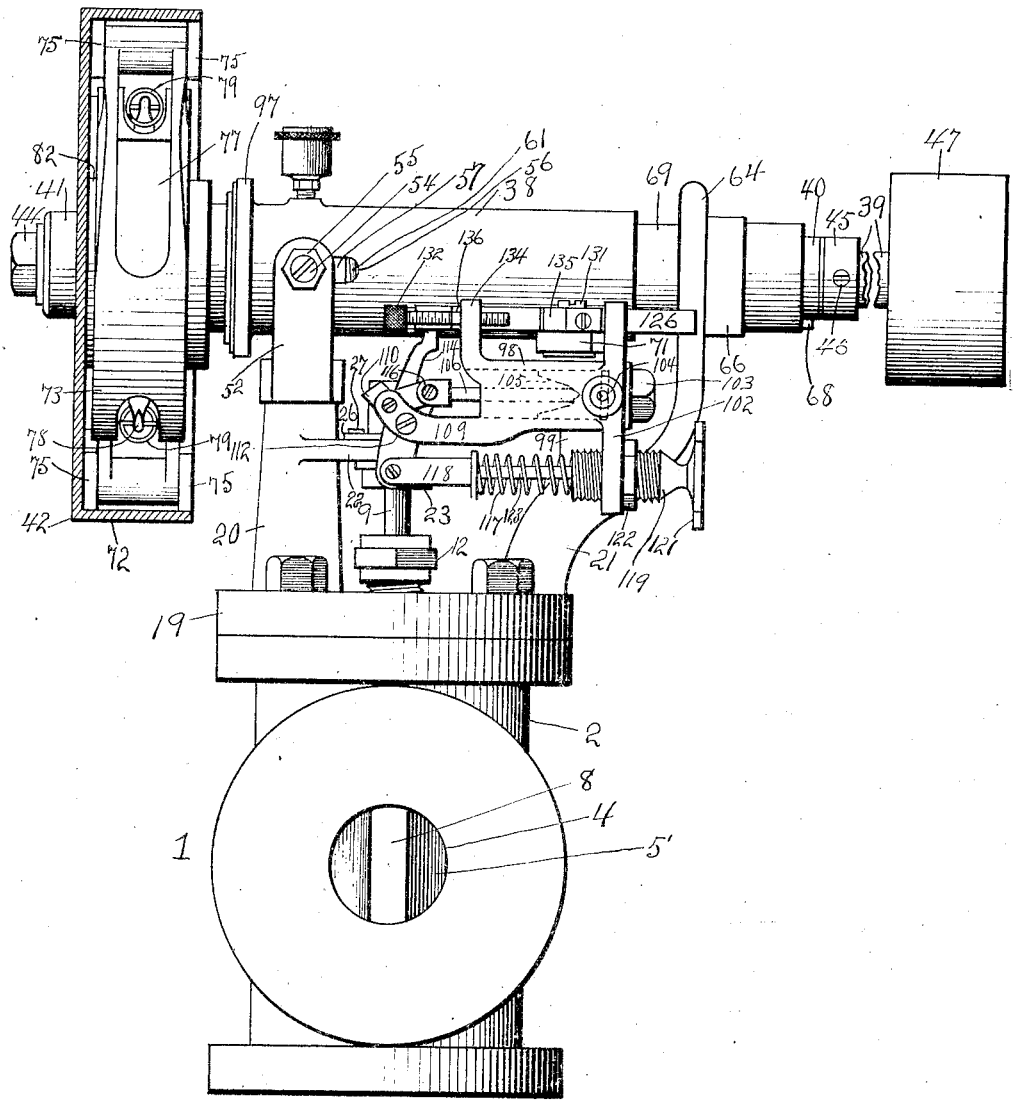

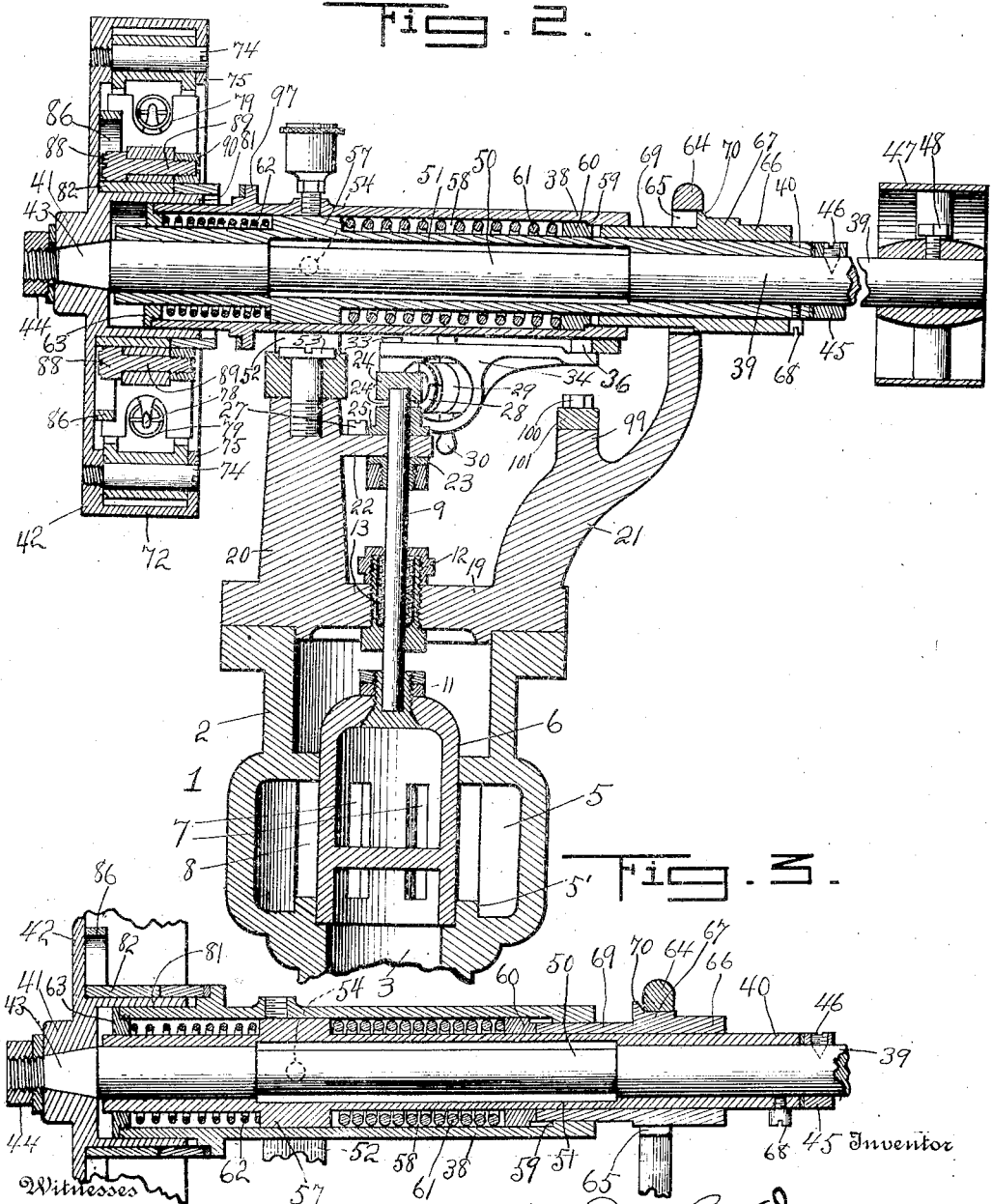

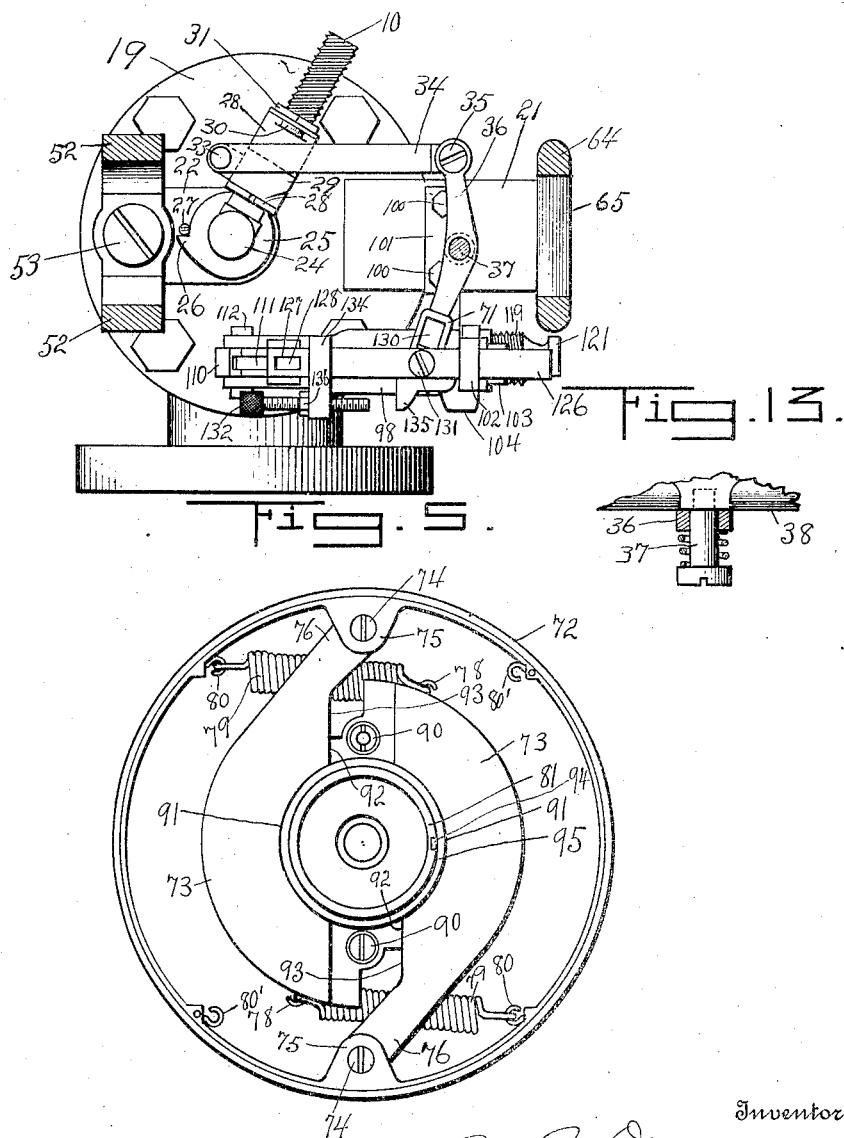

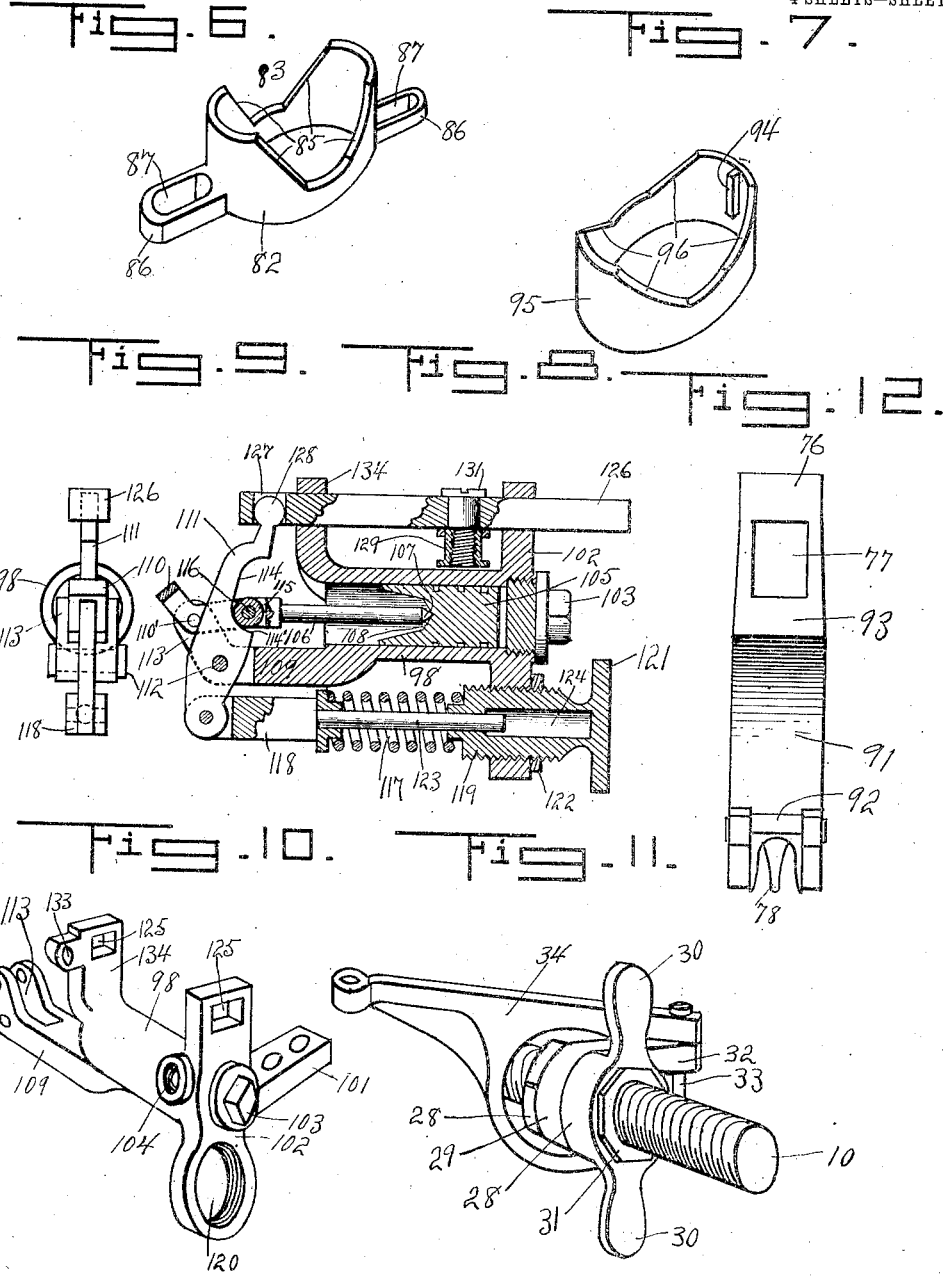

JOHN L. OSBORNE, OF ERIE, PENNSYLVANIA.

COMBINED GOVERNOR AND REGULATOR FOR AIR-COMPRESSORS.

963,803.  Specification of Letters Patent.  Patented July 12, 1910.

Application filed March 5, 1910. Serial No. 547,600.

*To all whom it may concern:*

Be it known that I, JOHN L. OSBORNE, a citizen of the United States, residing at Erie, in the county of Erie and State of Pennsylvania, have invented certain new and useful Improvements in Combined Governors and Regulators for Air-Compressors, of which the following is a specification.

This invention relates to improvements in combined governor and regulator for air compressors.

This device is designed for use in connection with any type of air compressor and either a single acting or multiple compressor, it being understood that whatever form of compressor is employed, the same being operated through the agency of a supplied fluid, a regulation thereof affects throttling of the motor. With the provision therefore of the ordinary fluid supply valve, for supplying such fluids as steam or water to the prime mover of preferred type, the present invention may be termed as three-fold in its complete regulation and governing of the air compressor.

First, there is provided a centrifugal weight governor operating through special mechanism to regulate said fluid supply valve. In the ordinary use of centrifugal governors in connection with motors, the slowing down of a motor for any cause, such as an overload, results automatically in opening the fluid supply valve a desired degree for accelerating the speed of the motor. In connection with an air compressor, the non-use of the pumped fluid or compressed air, would cause a back pressure upon the pumps and a consequent slowing down of the motor, which would ordinarily result in an automatic increase of the actuating fluid and a consequent acceleration of the motor, which, it is evident would cause a further increase of the pumped air pressure above the normal or desired pressure.

The second provision therefore herein devised is an auxiliary pneumatic regulator for use in conjunction with said centrifugal governor and designed to accommodate such governor for use upon air compressors when combined therewith. In whatever use the air compressor may be employed, a predetermined constant pressure of the pumped air is ordinarily desired and the present provision through a pneumatic device, results in bringing the speed regulating means into complete control of the motor at any desired degree of pressure. That is, an auxiliary air cylinder communicating with the pumped air supply, is in such control of the fluid supply valve as in itself to regulate such supply and even to close such valve entirely upon a predetermined increase above normal of the air pumped or stored; and by such pneumatic regulator absolutely fixing the maximum at which such valve may be opened by the centrifugal governing means of the motor and thus through such governor maintaining such maximum speed whatever such maximum may be, as established by the pneumatic regulating means aforesaid.

A third coöperating mechanism automatically operates in connection with the entire general structure to completely close the fluid supply valve of the motor upon a breaking or removal of the operating belt of the governor shaft.

Having set forth these general objects of the invention the same will now be fully described in connection with the accompanying drawings.

In the drawings forming a part of this application and in which like numerals of reference designate corresponding parts throughout the several views,—Figure 1 is a side elevation of the combined devices mounted upon a fluid supply valve casing and showing the balance wheel in section, all of the mechanism being as positioned when the compressor is not running, Fig. 2 is a vertical longitudinal section of Fig. 1, Fig. 3 is a longitudinal section of the shaft mechanism similar to that shown in Fig. 2 illustrating the elements as positioned when the compressor is in full operation, Fig. 4 is a top plan view of the mechanism shown in Fig. 1 with the entire shaft and its carried mechanisms removed and showing the pneumatic regulator upon the valve casing top, Fig. 5 is an inside view of the balance wheel and centrifugal governor, the same being removed from the engine shaft, Figs. 6 and 7 are perspective views of the cam collars of the governor, Fig. 8 is a vertical longitudinal section of the pneumatic regulating mechanism, Fig. 9 is an end elevation thereof, Fig. 10 is a perspective view of the main frame portion of the pneumatic regulator, Fig. 11 is a perspective view of the valve lever and its adjusting toggle connections, Fig. 12 is an inside elevation of one of the weight members of the governor, and Fig. 13 is a detail sectional view of the spring pivot mechanism.

In taking up in detail the description of the drawings, the mechanisms combining to form the third subdivision above noted will be first commented upon for the reason that they are general to the entire structure and that a clear understanding thereof at the outset will render the operation of the centrifugal governor and pneumatic regulator an easy matter upon describing the details of each of the same.

It is to be understood that the compressor engine is actuated by the fluid received thereby through the fluid supply valve 1 of the usual construction known as a ported rotary valve. This valve mechanism, plainly shown by the sectional view thereof designated Fig. 2, comprises the T-shell 2 with the inlet port 3 and outlet port 4, having the chamber 5 accommodating the rotatable bowl-shaped valve member 6, which is provided with suitable ports 7, which ports are adapted to be brought into and out of registry with the ports 8 of corresponding size in the inner casing 5′ of the chamber 5, and thus by rotation of said valve 6 regulating the flow of the supplied fluid through said valve casing. Extending upwardly from said valve 6 is positioned the valve stem 9 having secured upon the top thereof the actuating arm 10. The valve stem 9 is fixed to the valve by the securing means 11 and passes vertically through the stuffing box 12 provided in the aperture 13 in the circular top plate 19 positioned upon said T-shell 2. Said plate 19 forms the base support for the combined mechanisms forming the present invention and has mounted thereon, and preferably integral therewith as here shown, the posts 20 and 21 positioned upon opposite sides of said perforation 13, which latter is substantially central of said plate. The radial arm 22 extending inwardly from the post 20 is provided with a bushing member 23 through which extends said valve stem 9, while the upper part 24 thereof is provided with said lever 10 constructed integral therewith and also with a base flange 25 having a projecting lug 26 formed thereon and adapted to contact the pin 27 at the assumption by the lever 10 of the position at which the fluid supply valve 1 is completely closed, said pin being upon the arm 22 and the pin 24′ securing the valve stem to said part 24.

The toggle connection for operating said valve stem lever 10 is shown in detail in Fig. 11 and comprises the split nut 28 having the collar 29 journaled thereon and which is easily adjusted upon said exteriorly-threaded lever-arm 10 by the projecting wings 30 and is locked in adjustment by the set nut 31. Said collar 29 employs the perforated lugs thereof 32 for journaling the pin 33 extending therethrough and pivoting thereto the connecting yoke arm 34 of the toggle, while the opposite end of said arm is pivoted as at 35 to the connecting lever 36 spring pivoted as at 37 to the sleeve 38 for the purposes hereinafter fully set forth.

A governor shaft 39 belted to the main drive or crank shaft of the compressor or its motor, is journaled within the sleeve 40 through which it extends and projects for a suitable distance for receiving the hub 41 of the balance wheel 42 which is secured to the tapered end 43 thereof by the set nut 44, while for preventing any possible movement of the shaft longitudinally of the sleeve 40, there is provided the stop ring 45 fixed to the shaft by the screw pin 46. While such mounting of the governor shaft directly upon the valve casing is preferred, other mountings may be used for accommodating the present mechanisms, but in either event the driving belt pulley 47 is secured to said shaft as by the set bolt 48. Within the sleeve 40 said shaft is reduced throughout the central portion 50 thereof for reducing the friction between the same and said sleeve within which it is journaled, said sleeve also having a correspondingly enlarged bore portion 51.

The integral post 20 hereinbefore described has mounted thereon the yoke member 52 secured as by the screw 53 and forming a rigid attachment, while its opposite arms are provided with alining perforations receiving stub shafts 54 retained therein by the set nuts 55. Said stub shafts 54 extending through the longitudinal slots 56 in the outer casing 38 are received at opposite points within sockets diametrically positioned in the exterior periphery of the sleeve 40 and at the enlarged or shouldered portion 57 thereof and by which means said shaft 39 is pivoted in the yoke 52 and so supported upon the plate base 19.

The bore 58 of the sleeve 38 having a contracted portion adjacent the inner end thereof provides the shoulder 59 against which is seated the collar 60 surrounding the sleeve 40 while the enlarged portion 57 of said latter sleeve provides shoulders on the opposite sides thereof for seating one end of the coil spring 61 and the other end of which contacts said collar 60, and the coil spring 62 which latter is retained within said sleeve 38 by the annular end cap 63 through which cap the outer end of the sleeve 40 extends, said springs both encircling the sleeve 40.

The post 21 terminates in a rectangular head 64 having the rectangular opening 65 through which and of less diameter than which, extends the sleeve 66 having a central rectangular ridge 67, the extreme front end 69 of which sleeve enters the sleeve 38, while the outward movement thereof is limited by the pin 68 mounted upon the sleeve 40, both end portions of the sleeve being cylindrical.

In the operative position of the parts as shown in Fig. 3, the inner portion 69 of the sleeve 66 is so positioned as to slightly compress the encircling spring 61 by the engagement of the inner end of said sleeve with the movable collar 60, which movement also positions the collar 60 out of engagement with the shoulder 59, during the operation of the device. The squared middle portion 67 being provided with the front wedge-shaped ridge 70, such ridge is received through the rectangular opening and protrudes therefrom, having the remaining upper face of the rectangular ridge 67 flatly contacting the inner face of the head 64.

The governor shaft as here illustrated has certain parts thereof arranged designedly for a belt connection between the pulley 47 thereof and a driving shaft positioned substantially in vertical relation therewith and belted thereto.

It is to be understood that the present combined governor regulator is essential to the perfect operation of the air compressor and that the same is in complete control of the compressor at all times during the operation of the latter. This being so, a belted relation between the governor shaft 39 and the compressor motor or engine is a constant one, excepting in cases of an accidental breaking of the belt connection or the removal of the belt effecting the same.

It is so essential that the present devices be in complete control at all times during the operation of the compressor, that there is provided the automatic means whereby should an accidental breaking or slipping off of the belt communicating with the pulley 47 occur, the air compressor will be at once brought to a dead stop. This result it will be seen is readily accomplished by the mechanisms just described and during which action of the parts their positions are relatively changed from that shown in Fig. 3 to the disclosures thereof in Fig. 2. In such operation the spring 61 acting to expel the sleeve 66 from the receiving sleeve 38 is normally prevented from effecting such an expulsion by the forced retention of the wedge-shaped ridge 70 protruding through the rectangular opening 65 and contacting the inner face of the frame 64 thereof, in which contacting relation said parts are maintained by the normal upward pull of the belt upon the pulley 47 at all times during the operation of the device. Upon a releasing of the belt tension for any reason, the outward exertion of the spring 61 forces the sleeve 66 outward, with the wedge-shaped ridge 71 sliding within and substantially through the opening 65 of the head 64 and such outward movement being limited by the pin 68 before noted. The spring 61 being seated upon the collar normally held out of engagement during running position with the shoulder 59, is brought into forcible engagement therewith during the above described outward movement of the parts, so that after the contacting of said collar 60 with the shoulder 59 during the outward movement thereof, an outward movement would also be imparted to the containing sleeve 38, which latter as before noted has pivoted to the underneath side thereof as at 37 the lever 36 effecting communication between said collar 38 and the actuating lever 10 of the fluid supply valve 1. The result therefore of the removal of the belt is to trip the retaining sleeve 66 and release the spring 61 whereby the sleeve 38 is moved outwardly and the fluid supply valve 1 of the compressor motor completely closed. For this operation the position of the opposite slotted end 71 of the lever 36, as hereinafter fully described is immaterial as such end in this connection affords only the fulcrum point for said lever operated by the application of power at the pivot point 37 upon the actuating sleeve. For providing a belt connection below or at either side of the shaft, the sleeve 66 may be rotated as many quarter turns as desired, and then seated as before within the opening 65.

*The centrifugal governor.*—The first of the two combined mechanisms primarily constituting the present invention consists of the centrifugal governor which as hereinbefore noted is mounted in the ordinary manner upon the outer tapering end 43 of the governor shaft 39. The construction thereof consists of the fly or balance wheel 42 in the form of an annular casing 72 provided with the internally arranged weights 73 pivoted at diametrically opposite points therein upon the pins 74 positioned through perforations provided in integral projecting lugs 75 carried by the inner periphery of said casing. These weights are so pivoted at the perforated ends 76 thereof, that said perforation being designated as 77 in Fig. 12, which latter is a view of the inner face of a single weight detached from the governor, while the outer ends are provided on the exterior faces thereof with the hook members 78 adapted to resiliently connect said ends of the weights through the perforation 77 of the relatively adjacent weight by the coil springs 79 which have one end attached to corresponding hooks 80 also positioned upon diametrically opposite inner portions of said casing. Surrounding the inner hub flange 81 and freely positioned for rotation thereon is the collar 82, having the opposite cut-out portions 83 forming the four cam faces 85 thereon, said cam collar having oppositely projecting ears 86 within the slots 87 of which are accommodated the roller ends 88 of the pins 89 secured through perforations in the weight ends by the locking members 90. The weights 73 may be reversed by employing the further hooks 80'. The general operation of these governing weights will be apparent, it being noted that the rapid rotation of the containing wheel member 42 results in the centrifugal action imparted thereby upon the weight 73 in swinging the same in opposite directions toward the inner periphery of the casing 72 and against the predetermined degree of centripetal resilience afforded by the coil springs 79 previously described; any movements of the weights 73 thereby impart through the roller ends 88 a partial rotation to the cam collar 82 as such roller ends are forced in their sliding movement within the slots 87 to so impel said collar. The inner face 91 of each weight constitutes a true semi-circle and such semi-circular inner faces of the pair of weights as shown in Fig. 5 form the complete circular inclosure for the cam collar 82, the roller end of each weight having a terminal abutting face 92 engaging the contiguous squared portion 93 of the companion weight when the governor is at rest. Feathered upon the hub flange 81 as at 94 is the companion cam collar 95 having free longitudinal movement upon said hub flange under the action of the cam faces 85 of the operating collar 82 upon complementary cam faces 96 of the actuated collar 95.

With the provision of the regular annular engaging flange 97 adjacent the outer end of the longitudinal movable sleeve 38, normally in contact with the actuated cam collar 95, which contact is normally insured by action of the spring 62 during the belted up or active relation of the governor shaft, the complete operation of said described governing mechanism is believed to be evident.

The outward impulses effected upon the weights by the centrifugal action results in the longitudinal inward variations of movement of the sleeve 38, and the return thereof being effected by the spring 62, it is evident that the lever 36 is constantly moved upon its pivotal connection 37 with the sleeve upon all variations in speed of the governor shaft; while there is occasioned thereby a consequent imparted partial rotation to the valve stem 9 which obviously results in an opening or closing of the valve 1 for varying, accurately governed, the supply of the actuating fluid to the air compressor engine or motor. In the lever connections through which these operations are effected, it is evident that the operations of the weights upon the fluid valve may be limited by varying the determined length of some of said connections through the agency of the positioning of the nut as desired upon the screw-threaded valve stem lever 10; it being further noted that the position of the sleeve 38 is constantly changing when the governor shaft is in motion, thus employing the said end 71 of the lever 36 as the fulcrum point, while movement is imparted by said sleeve 38 to said lever at the point of said spring pivot connection 37 therebetween.

*The pneumatic regulator.*—The second general provision hereinbefore referred to which constitutes a complete pneumatic regulator will now be described and also its co-action with the hereinbefore described centrifugal governing means as well as incidentally with the belt released safety mechanisms. The main frame work of this structure as shown separated from all other parts in the perspective view, Fig. 10, is mounted upon the offset 99 of said post 21 by the bolts or other securing means 100 engaging the bar 101 of said frame work, and which extends at substantially right angles thereto. The main feature of said frame work consists of the pneumatic cylinder 98 having at one end thereof the cross head 102 which has a port opening thning and communicating with said cylinder which port is normally closed by the screw-threaded plug 103. Adjacent said ported end of the cylinder is provided the inlet port 104 adapted for connection with the pumped compressed air or the storage receptacle therefor and thus communicating the varying pressure of the pumped air upon the piston 105 operatively positioned within the cylinder. The aforesaid cylinder is open at its outer end allowing the entrance of the piston rod 106 having a pointed end 107 freely resting within the circular socket 108 formed in the outer end of the piston and by which construction the air pressure actuating said piston forces outwardly the piston rod, which latter is in turn pivoted to the arm 109 of the frame through the agency of the angularly bent link 110.

The lever 111 adapted to be actuated by said pneumatic means is pivoted upon the pin 112 and within the slotted extension 113 of said arm 109 of the frame, while said lever 111 further extends through the link 110 and upon the curved inner face 114 of which the roller bearing 115 is adapted to bear, said roller bearing being journaled within the link 110 and upon the pin 116 extending through the end of the piston rod. For returning the piston rod and piston inwardly against the air pressure and for regulating the force of said return pressure, is provided the spring 117 encircling and forcing outwardly the link 118 pivoted to the lower extremity of said lever 111, while a movable plug 119 furnishes the other abutment for said spring and whereby through the rotation of said plug within the screw-threaded opening 120 of the cross head 102, the resiliency of said spring is easily adjusted. Said plug is preferably provided at its outer end with wings or extensions 121 for easily turning the same while a set nut 122 retains the member in the desired adjusted position, the entrance of the reduced extension 123 of the link 118 within the bore 124 of the plug being evident from an inspection of the sectional view of the structure.

Within the rectangular alining openings 125 of the frame, is slidably-mounted the rectangular slide rod 126 having a vertical slot 127 provided through its outer end, in which slot and bearing upon the sides thereof when being actuated is the rounded or cylindrical upper end 128 of the lever 111. Pivotally-mounted upon said slide rod at a point thereon between its supports is the adjacent end of the lever 36, such pivoting being accomplished by the positioning of the spool 129 within the slot 130 of the lever end 71 heretofore referred to, this spool being secured to the slide rod by the screw 131.

From the above descriptions will be noted the link and pivot connections between the rotatable valve stem 9 and the slide rod 126 and an actuation of the latter to its fullest extent will obviously result in a complete closing of the fluid inlet valve 1. In the actuations of said valve by this pneumatic element, the sleeve pivot 37 constitutes the fulcrum.

In using the pneumatic regulator in connection with a single acting compressor it is essential that provision be made against the complete closing of the fluid supply valve which would possibly result in stalling the compressor on a dead center. This is provided by positioning the adjustable pin 132 within the opening 133 of the cylinder extension 134, which extension also supports the slide rod and is opposed to the head 102; and in further placing upon said slide rod the stop lug 135, which being in a line with the inner free end of the pin 132, is adapted to engage the same upon its reciprocation with the slide rod 126, and thus the throw of said rod is limited as desired, said pin being adjustably retained by the set nut 136.

Considering the fluid inlet valve 1 in communication with a full head of steam, and the limiting pin 132 at its outermost position, the operation of the pneumatic regulator will now be noted.

The belt connection being perfect and the compressed air within the outlet distributing members or the storage receptacle being above normal, the compressors will be inactive for the reason that the actuating fluid supply valve 1 will be maintained closed by the air pressure exerted upon the piston 105 occasioning the extreme outward throw of the slide rod 126. A reduction in the pressure of the pumped air which may be occasioned by a use of some of the supply thereof, results in a consequent decrease in pressure of air within the cylinder 98 whereupon the piston 105 incidentally responds by an inward movement, which, through the link and pivot connection, actuates the supply valve 1 a sufficient amount and the air compressor engine or motor thereby being supplied with its fluid, begins its operation of the air compressor, which continues until the closing of said fluid supply valve. With a continued pumping of the air and a nonuse thereof an excess of air pressure will be occasioned, which being communicated to the pneumatic cylinder 98 automatically closes the fluid supply valve for the motor which stops the same until the air pressure drops below normal, whereupon the rearward throw of the slide rod 126 occasioned by the action of the spring 117, made possible by the reduction of air pressure behind the piston 105, results in the opening of the supply valve. The broad co-action between this pneumatic regulation and the centrifugally governed sleeve 38 resides in the accurate positioning of a fulcrum spool 129 at a position to allow the fluid supply valve 1 to be opened only a predetermined maximum amount. A constant pressure within the pneumatic cylinder 98, whatever the degree of pressure may be, positions fulcrum point 129 in a fixed position, while in any other degree of pressure, a different fixed position will be assumed thereby and each position thereof determines the limit to which the fluid valve may be opened. The pneumatic regulator will first be set to operate between any two desired limits of air pressure, by the use of the tension adjusting means of the piston return spring 117. Such fulcrum being so positioned by the action of the piston between said two limits of pressure, and determining thereby the extreme limit at which the fluid valve may be opened, the speed of the engine is maintained normal through the action of the centrifugal governor hereinbefore fully described and which governor controls the amount of actuating fluid delivered to the engine by the valve 1 within the limit or up to the point of the maximum as set by said pneumatic regulating mechanism as just described.

The adjustment of the nut 29 upon the valve lever 10, it will be noted, changes the length of the lever connections between the pivoted member 36 and said lever, while the changing of the position of such nut upon the lever results in accurately determining the length of reciprocations of which the sleeve 38 is capable, under the influence of the centrifugal governing means.

It will be noted that the lower portion of the curved bearing face 114 of the lever 111 is curved abruptly to form an end seat 114' for the roller bearing 115, so as to position the same at its lowest point of movement with the connected piston rod 106 in a substantially horizontal plane. In connection with the function and operation of the angular link 110 in its rocking movement during the contacting of its roller member 115 with the lever face 114, it will be seen that the angular fixed positions of the fulcrums of the several different parts are such that considering the pivot 112 of the lever 111 in connection with the pivot 110' of the link 110, both pivots being in the arm 109, and also together with the piston rod pin 106, upon an outward movement of the piston under the influence of the increased pumped fluid pressure, the distance between the members 116 and 112 is increased and the leverage vantage is enhanced thereby to a corresponding degree while simultaneously therewith the tension of the spring 117 increases.

The accurate setting of the pneumatic regulator by means of the spring 117 and its follower 119 may be best illustrated by referring to an actual test thereof. A complete regulation of the air pressure may be desired between any two limits of such pressure, such for instance as a variation of 5 pounds. With such a limit it is obvious that a change of 5 pounds in the air pressure must result in a travel of the lever arm 111 through its entire path of travel and the consequent complete compression of said spring 117. It has been found that the force obtained with 100 pounds of air pressure upon the piston is about 44 pounds while with 105 pounds of air pressure the force obtained is about 46.2 pounds. It is also accurately determined that the complete compression of the spring ⅜ of an inch requires 22 pounds of exerted force being the difference between an initial pressure of 44 pounds and a maximum pressure of 66 pounds of force upon said spring. As the above variations of 5 pounds in the air pressure upon the piston results only in a variation of 2.2 pounds of force as exerted upon the spring 117, it is essential to the perfect operation of the regulator that the remainder of the 22 pounds required or in other words 19.8 pounds of force be provided for, and such is now attained by automatically compounding the leverage vantage by the sliding movement of the roller bearing 115 upon the curved bearing surface 114 of the lever 111 as hereinbefore described. Thereby there is obtained a regulation of pressure within a variation of 5 pounds pressure upon the piston 105. There is no reduction in speed of the compressor until the maximum pressure is reached whereupon an excess of 5 pounds would then bring the compressor to a minimum speed and with a portion of this increase it would give the compressor the speed required to maintain a constant pressure whatever the requirement thereof within however the capacity of the machine.

What I claim is:

1. A combined engine governor and regulator for air compressors comprising a governing means for controlling the supply of motive fluid to the engine, and means for maintaining under a constant pressure the air pumped by the compressor.

2. A combined engine governor and regulator for air compressors comprising a governing means for controlling the supply of motive fluid to the engine, and means for maintaining under a constant pressure the air pumped by the compressor and independent of the governing means.

3. A combined governor and regulator for air compressors comprising governing means for regulating the supply of motive fluid to a prime mover for driving the compressor and means for maintaining under a constant pressure the air pumped by the compressor and for controlling the operation of the regulating mechanism.

4. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said regulating mechanism.

5. A combined governor and regulator for air compressors comprising a feed valve for regulating the supply of motive fluid to a prime mover for driving the compressor, means for governing the operation of the regulating mechanism, a shaft provided with said governing means mounted thereon, a shiftable element mounted on the governor shaft and actuated by said governing means, said shiftable element connected to said regulating mechanism, and means for maintaining under a constant pressure the air pumped by the compressor.

6. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve, and means for maintaining under a constant pressure the air pumped by the compressor, and for controlling the operation of the regulating element.

7. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve, and means for maintaining under a constant pressure the air pumped by the compressor, and for controlling the operation of the regulating element, independent of the governing means.

8. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated in one direction by the governing means.

9. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated in one direction by the governing means, and means for maintaining under a constant pressure the air pumped by the compressor.

10. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated in one direction by the governing means, and means for maintaining under a constant pressure the air pumped by the compressor and for controlling the operation of the feed valve.

11. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated i one direction by the governing means, and means for maintaining under a constant pressure the air pumped by the compressor and for controlling the operation of the feed valve independent of the governing means.

12. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated in one direction by the governing means, means for maintaining under a constant pressure the air pumped by the compressor, and an operative connection between said feed valve and the constant pressure maintaining mechanism.

13. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated in one direction by the governing means, and means for maintaining under a constant pressure the air pumped by the compressor and for controlling the operation of the feed valve independent of the governing means, and an operative connection between said feed valve and the constant pressure maintaining mechanism.

14. A combined governor and regulator for air compressors comprising a feed valve for regulating the supply of motive fluid to a prime mover for driving the compressor, means for governing the operation of the feed valve, a shaft provided with said governing means mounted thereon, a shiftable element mounted on the governor shaft and actuated by said governing means, said shiftable element connected to said feed valve for controlling the latter when actuated in one direction by the governing means, means for maintaining under a constant pressure the air pumped by the compressor and for controlling the operation of the feed valve, and an operative connection between said feed valve and the constant pressure maintaining mechanism.

15. A combined engine governor and regulator for air compressors comprising a governor mechanism driven from the engine, a regulating motive fluid supply valve for the engine controlled by said governor mechanism, means for maintaining under a constant pressure the air pumped by the compressor and for controlling the operation of the feed valve, and means for automatically shifting the feed valve to closed position when the transmission between the governor mechanism and the engine is interrupted.

16. A combined engine governor and regulator for air compressors comprising a governor mechanism driven from the engine, a regulating motive fluid supply valve for the engine controlled by said governor mechanism, means for maintaining under a constant pressure the air pumped by the compressor and for controlling the operation of the feed valve, a longitudinally shiftable sleeve element, said shiftable element connected to the feed valve, and means for automatically shifting the feed valve to closed position when the transmission between the governor mechanism and the engine is interrupted.

17. A combined engine governor and regulator for air compressors comprising a governor mechanism driven from the engine, a regulating motive fluid supply valve for the engine controlled by said governor mechanism, means for maintaining under a constant pressure the air pumped by the compressor and for controlling the operation of the feed valve, a longitudinally shiftable sleeve element, said shiftable element connected to the feed valve, for controlling said latter named mechanism when the shiftable element is actuated in one direction by the governor mechanism, and means for automatically shifting the feed valve to closed position when the transmission between the governor mechanism and the engine is interrupted.

18. A combined engine governor and regulator for air compressors comprising a governor mechanism driven from the engine, a regulating motive fluid supply valve for the engine controlled by said governor mechanism, means for maintaining under a constant pressure the air pumped by the compressor and for controlling the operation of the feed valve, a longitudinally shiftable sleeve element, said shiftable element connected to the feed valve, for controlling said latter named mechanism when the shiftable element is actuated in one direction by the governor mechanism, an operative connection between said feed valve and the constant pressure maintaining mechanism, and means for automatically shifting the feed valve to closed position when the transmission between the governor mechanism and the engine is interrupted.

19. A combined engine governor and regulator for air compressors comprising a governor mechanism driven from the engine, a regulating motive fluid supply mechanism for the engine controlled by said governor mechanism, means for maintaining under a constant pressure the air pumped by the compressor and for controlling the operation of the regulating mechanism, a longitudinally shiftable sleeve element, said shiftable element connected to the regulating mechanism, for controlling said latter named mechanism when the shiftable element is actuated in one direction by the governor mechanism, an operative connection between said shiftable element and the constant pressure maintaining mechanism, and means for automatically shifting the regulating mechanism to closed position when the transmission between the governor mechanism is interrupted.

20. A combined engine governor and regulator for air compressors comprising a governor mechanism driven from the engine, a regulating motive fluid supply mechanism for the engine controlled by said governor mechanism, means for maintaining under a constant pressure the air pumped by the compressor and for controlling the operation of the regulating mechanism, and an operative connection between said regulating mechanism and the constant pressure maintaining mechanism.

21. A combined engine governor and regulator for air compressors comprising a governor mechanism driven from the engine, a regulating motive fluid supply mechanism for the engine controlled by said governor mechanism, means for maintaining under a constant pressure the air pumped by the compressor and for controlling the operation of the regulating mechanism, an operative connection between said regulating mechanism and the constant pressure maintaining mechanism, and means for automatically shifting the regulating mechanism to closed position when the transmission between the governing mechanism and the engine is interrupted shutting off the supply of motive fluid to the engine.

22. A combined engine governor and regulator for air compressors comprising a governor mechanism driven from the engine, a regulating motive fluid supply mechanism for the engine controlled by said governor mechanism, means for maintaining under a constant pressure the air pumped by the compressor and for controlling the operation of the regulating mechanism, an operative connection between said regulating mechanism and the constant pressure maintaining mechanism, and a longitudinally shiftable sleeve element, a toggle lever connection between said shiftable element and the regulating mechanism for controlling said regulating mechanism when said sleeve element is actuated in one direction by the governing mechanism.

23. A combined engine governor and regulator for air compressors comprising a governor mechanism driven from the engine, a regulating motive fluid supply mechanism for the engine controlled by said governor mechanism, means for maintaining under a constant pressure the air pumped by the compressor and for controlling the operation of the regulating mechanism, an operative connection between said regulating mechanism and the constant pressure maintaining mechanism, a longitudinally shiftable sleeve element, a toggle lever connection between said shiftable element and the regulating mechanism for controlling said regulating mechanism when said sleeve element is actuated in one direction by the governing mechanism, and means for automatically shifting the regulating mechanism to closed position and shutting off the supply of motive fluid to the engine when the transmission between the governing mechanism and the engine is interrupted.

24. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism.

25. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, and means for maintaining under a constant pressure the air pumped by the compressor.

26. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, and means for maintaining under a constant pressure the air pumped by the compressor and for controlling the operation of the regulating mechanism.

27. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, and means for maintaining under a constant pressure the air pumped by the compressor and for controlling the operation of the regulating mechanism independent of the governor mechanism.

28. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, means for maintaining under a constant pressure the air pumped by the compressor, and an operative connection between said regulating mechanism and the constant pressure maintaining mechanism.

29. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, means for maintaining under a constant pressure the air pumped by the compressor, and an operative connection between said regulating mechanism and the shiftable sleeve element.

30. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, means for maintaining under a constant pressure the air pumped by the compressor, and an operative connection between said regulating mechanism and the constant pressure maintaining mechanism, and means for automatically shifting the regulating mechanism to closed position and shutting off the supply of motive fluid to the engine upon the interruption of the transmission between the governing mechanism and the engine.

31. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, said governing mechanism adapted for imparting longitudinal movement to one of said cam collars, said movable cam collar adapted to abut said shiftable element for actuating the same under the influence of the governing mechanism, means for maintaining under a constant pressure the air pumped by the compressor, an operative connection between said regulating mechanism and the shiftable sleeve element, and means for automatically shifting the regulating mechanism to closed position and shutting off the supply of motive fluid to the engine upon the interruption of transmission between the governing mechanism and the engine.

32. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said movable cam collars adapted to abut said shiftable element for actuating the same under the influence of the governing mechanism.

33. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism, and means for maintaining under a constant pressure the air pumped by the compressor.

34. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism, and for controlling the operation of the regulating mechanism.

35. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism independent of the governor mechanism.

36. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism, and an operative connection between said regulating mechanism and the constant pressure maintaining mechanism.

37. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism, and an operative connection between said regulating mechanism and the shiftable sleeve element.

38. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism, and means for automatically shifting the regulating mechanism to closed position and shutting off the supply of motive fluid to the engine upon the interruption of transmission between the governing mechanism and the engine.

39. A combined governor and regulator for air compressors comprising a governor mechanism driven from the engine, a shaft upon which said mechanism is mounted, a shiftable sleeve element mounted upon said governor shaft, a regulating motive fluid supply mechanism for the engine, collars mounted upon said governor shaft, complemental cam edges provided upon said collars, one of said cam collars longitudinally movable upon said shaft and the other collar rotatably mounted thereon, said governing mechanism adapted for imparting longitudinal movement to one of said cam collars, said longitudinally movable cam collar adapted to abut said shiftable element for actuating the same under the influence of the governing mechanism, an operative connection between said regulating mechanism and the shiftable sleeve element, and means for automatically shifting the regulating mechanism to closed position and shutting off the supply of motive fluid to the engine upon the interruption of transmission between the governing mechanism and the engine.

40. A combined engine governor and regulator for air compressors comprising a governor mechanism driven from the engine, a regulating motive fluid supply mechanism for the engine influenced by said governor mechanism, an auxiliary cylinder and communication between the same and the pumped fluid, a piston within said cylinder and adapted to be impelled in one direction by said fluid within the cylinder, operative connection between said piston and the governing mechanism and the regulating mechanism.

41. A combined engine governor and regulator for air compressors comprising a governor mechanism driven from the engine, a regulating motive fluid supply mechanism for the engine influenced by said governor mechanism, an auxiliary cylinder and communication between the same and the pumped fluid, a piston within said cylinder and adapted to be impelled in one direction by said fluid within the cylinder, a piston rod entering said cylinder and freely engaging one end of the piston therein, an angular link pivoted to the outer end of said rod, a bifurcated arm extending from said cylinder, a lever pivoted between the bifurcations of said arm and projecting through said link, the latter being also pivoted between said bifurcations, a slidable rod and a free end of said lever engaging said rod and adapted to reciprocate the same, and an operative connection between said regulating mechanism and said slide rod.

42. A combined engine governor and regulator for air compressors comprising a governor mechanism driven from the engine, a regulating motive fluid supply mechanism for the engine influenced by said governor mechanism, an auxiliary cylinder and communication between the same and the pumped fluid, a piston within said cylinder and adapted to be impelled in one direction by said fluid within the cylinder, operative connection between said piston and the governing mechanism and the regulating mechanism, and means for automatically shifting the regulating mechanism to closed position and cutting off the supply of motive fluid to the engine when the transmission between the governor mechanism and the engine is interrupted.

43. A combined engine governor and regulator for air compressors comprising a governor mechanism driven from the engine, a regulating motive fluid supply mechanism for the engine influenced by said governor mechanism, an auxiliary cylinder and communication between the same and the pumped fluid, a piston within said cylinder and adapted to be impelled in one direction by said fluid within the cylinder, a piston rod entering said cylinder and freely engaging one end of the piston therein, an angular link pivoted to the outer end of said rod, a bifurcated arm extending from said cylinder, a lever pivoted between the bifurcations of said arm and projecting through said link, the latter being also pivoted between said bifurcations, a slidable rod and a free end of said lever engaging said rod and adapted to reciprocate the same, an operative connection between said regulating mechanism and said slide rod, and means for automatically shifting the regulating mechanism to closed position and cutting off the supply of motive fluid to the engine when the transmission between the governor mechanism and the engine is interrupted.

44. A combined engine governor and regulator for air compressors comprising a governor mechanism driven from the engine, a regulating motive fluid supply mechanism for the engine influenced by said governor mechanism, an auxiliary cylinder and communication between the same and the pumped fluid, a piston within said cylinder and adapted to be impelled in one direction by said fluid within the cylinder, a piston rod entering said cylinder and freely engaging one end of the piston therein, an angular link pivoted to the outer end of said rod, a bifurcated arm extending from said cylinder, a lever pivoted between the bifurcations of said arm and projecting through said link, the latter being also pivoted between said bifurcations, a slidable rod, supports provided upon said cylinder and having alining perforations for freely mounting said rod, one end of said rod provided with a vertical slot, one end of said lever having a rounded end freely fitting said slot, a resilient member connected to the opposite end of said lever and adapted to communicate an inward motion to said piston, an operative connection between said regulating mechanism and said slide rod, and means for automatically shifting the regulating mechanism to closed position and cutting off the supply of motive fluid to the engine when the transmission between the governor mechanism and the engine is interrupted.

45. A combined engine governor and regulator for air compressors comprising a governor mechanism driven from the engine, a regulating motive fluid supply mechanism for the engine influenced by said governor mechanism and auxiliary cylinder and communication between the same and the pumped fluid, a piston within said cylinder and adapted to be impelled in one direction by said fluid within the cylinder, a piston rod entering said cylinder and freely engaging one end of the piston therein, an angular link pivoted to the outer end of said rod, a bifurcated arm extending from said cylinder, a lever pivoted between the bifurcations of said arm and projecting through said link, the latter being also pivoted between said bifurcations, a slidable rod, supports provided upon said cylinder and having alining perforations for freely mounting said rod, one end of said rod provided with a vertical slot, one end of said lever having a rounded end freely fitting said slot, a resilient member connected to the opposite end of said lever and adapted to communicate an inward motion to said piston, an adjusting means for regulating the force exerted by said resilient member, a stop positioned upon said slide rod, an adjustable abutment adapted to be engaged by said stop for limiting the motion of said slide rod, an operative connection between said regulating mechanism and said slide rod, and means for automatically shifting the regulating mechanism to closed position and cutting off the supply of motive fluid to the engine when the transmission between the governor mechanism and the engine is interrupted.

46. A combined engine governor and regulator for air compressors comprising a governor mechanism driven from the engine, a governor shaft and said mechanism mounted thereon, a shiftable sleeve element mounted on said governor shaft and influenced in one direction by said governor mechanism, a resilient member surrounding said shaft normally positioning said shiftable element for engagement with said governor mechanism, a motive fluid supply valve for the engine, a screw-threaded lever operator for said valve, and a toggle connection between said shiftable element and said lever, said toggle member being adjustable upon said lever and adapted for regulating the length of movement of said sleeve.

47. A regulator for air compressors comprising an auxiliary cylinder and communication between the same and the pumped fluid, a piston within said cylinder and adapted to be impelled in one direction by said fluid within the cylinder, a piston rod entering said cylinder and freely engaging one end of the piston therein, an angular link pivoted to the outer end of said rod, a roller bearing positioned upon said rod and within said link, a bifurcated arm extending from said cylinder, a lever pivoted between the bifurcations of said arm and projecting through said link, the latter being also pivoted between said bifurcations at a point slightly removed from the pivot point of the link, a curved bearing surface upon one side of said lever and adapted to be engaged by said roller bearing upon a movement of said link and piston rod end and further adapted for increasing the leverage between said piston rod and lever.

In testimony whereof I affix my signature in presence of two witnesses.

JOHN L. OSBORNE.

Witnesses:
H. H. STERN,
H. G. DEMINGER.